(12) United States Patent
Moniz et al.

(10) Patent No.: US 10,683,806 B2
(45) Date of Patent: Jun. 16, 2020

(54) PROTECTED CORE INLET WITH REDUCED CAPTURE AREA

(71) Applicant: General Electric Company, Schenectady, NY (US)

(72) Inventors: Thomas Ory Moniz, Loveland, OH (US); Mark John Laricchiuta, West Chester, OH (US)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 15/398,820

(22) Filed: Jan. 5, 2017

(65) Prior Publication Data

US 2018/0187600 A1     Jul. 5, 2018

(51) Int. Cl.
    *F02C 7/05*          (2006.01)
    *F02K 3/06*          (2006.01)

(52) U.S. Cl.
    CPC .................. *F02C 7/05* (2013.01); *F02K 3/06* (2013.01); *F05D 2250/611* (2013.01); *F05D 2260/607* (2013.01); *Y02T 50/671* (2013.01); *Y02T 50/675* (2013.01)

(58) Field of Classification Search
    CPC ...... F02K 3/04; F02K 3/06; F02C 7/05; F02C 7/052; F02C 7/055; F02C 7/04; B64D 33/02; B64D 2033/0246; B64D 2033/022; B64D 2033/026
    See application file for complete search history.

(56) References Cited

U.S. PATENT DOCUMENTS

| | | | |
|---|---|---|---|
| 3,280,564 | A | 10/1966 | Keenan et al. |
| 3,352,110 | A | 11/1967 | Cresswell |
| 4,183,211 | A | 1/1980 | Menioux |
| 4,519,208 | A | 5/1985 | Loisy et al. |
| 5,794,432 | A | 8/1998 | Dunbar et al. |
| 5,884,843 | A | 3/1999 | Lidstone et al. |
| 6,050,527 | A | 4/2000 | Herbert et al. |
| 7,424,805 | B2 | 9/2008 | Johnson |

(Continued)

OTHER PUBLICATIONS

Mattingly, Jack D. Heiser, William H. Pratt, David T. (2002). Aircraft Engine Design (2nd Edition). (Chap 4 and 5). American Institute of Aeronautics and Astronautics.*

(Continued)

*Primary Examiner* — Craig Kim
*Assistant Examiner* — Alyson Joan Harrington
(74) *Attorney, Agent, or Firm* — Dority & Manning, P.A.

(57) ABSTRACT

A gas turbine engine defines a radial direction and an axial centerline. The gas turbine engine includes a core turbine engine that defines a core inlet. The core inlet is oriented with respect to the axial centerline and positioned along the radial direction such that the area available to capture foreign object debris is minimized. In one aspect, the gas turbine engine defines a capture ratio less than about 35%, wherein the capture ratio is a ratio of an area between a splitter radius and a tangency radius to an area encompassed by the splitter radius. The splitter radius is defined as a radial distance between the axial centerline and an outer lip of a splitter of the core turbine engine. The tangency radius is defined as a radial distance between the axial centerline and a tangency point, which can be defined at an inner lip of the core inlet.

16 Claims, 8 Drawing Sheets

(56) References Cited

U.S. PATENT DOCUMENTS

| | | | |
|---|---|---|---|
| 7,665,310 B2 | 2/2010 | Laborie | |
| 8,127,528 B2* | 3/2012 | Roberge | F02C 3/10 60/224 |
| 8,166,748 B2 | 5/2012 | Schilling | |
| 9,010,085 B2 | 4/2015 | Adams et al. | |
| 2009/0211221 A1* | 8/2009 | Roberge | F02C 3/10 60/226.1 |
| 2013/0000317 A1* | 1/2013 | Berryann | F02C 3/113 60/778 |
| 2015/0345404 A1 | 12/2015 | Adams et al. | |
| 2016/0076460 A1* | 3/2016 | Schwarz | F02K 3/06 60/805 |
| 2016/0108854 A1 | 4/2016 | Lord et al. | |
| 2016/0333734 A1* | 11/2016 | Bowden | B64D 33/02 |

OTHER PUBLICATIONS

Sforza, Pasquale M.. (2012). Theory of Aerospace Propulsion. Elsevier.*

\* cited by examiner

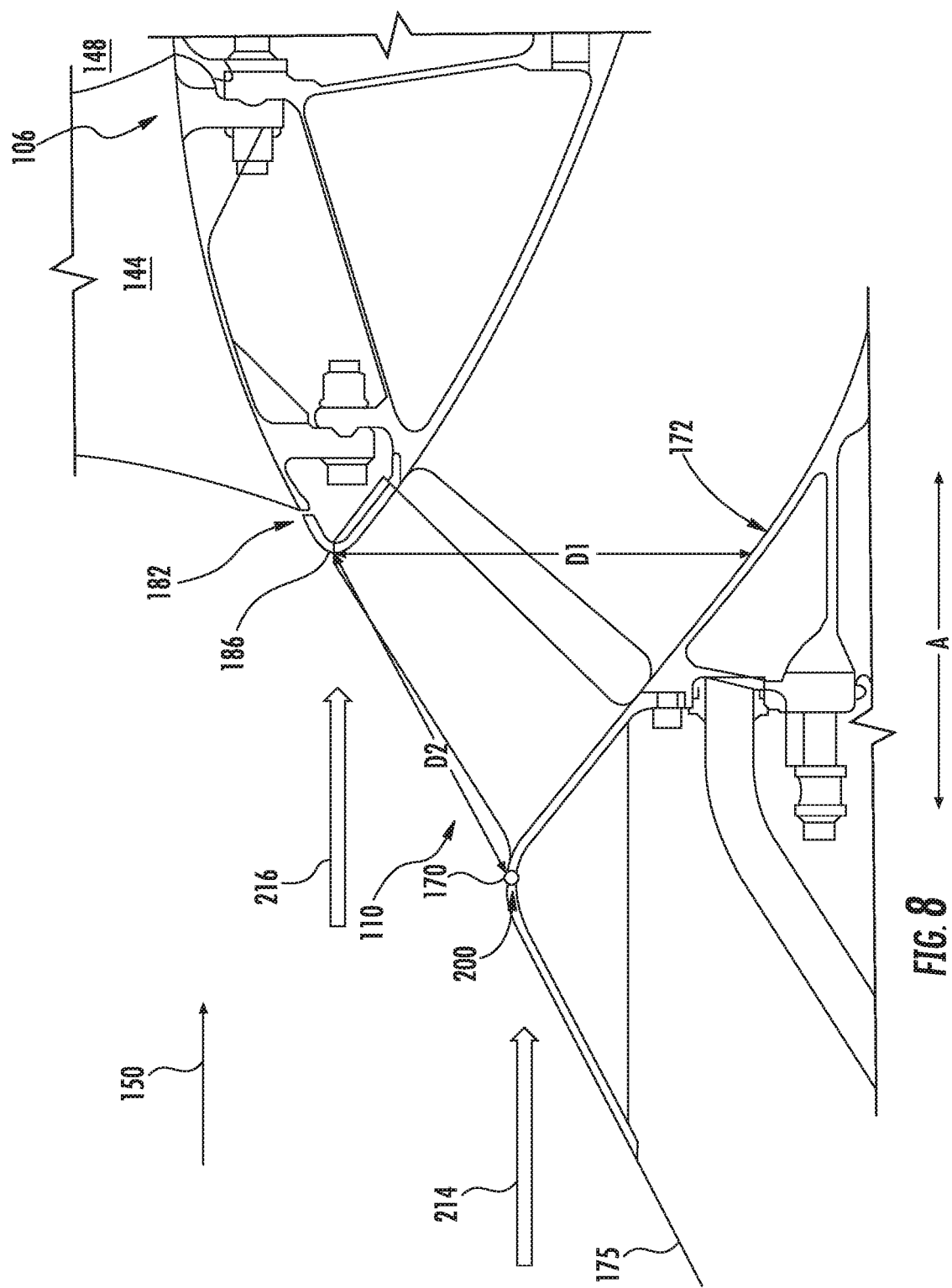

PROTECTED CORE INLET WITH REDUCED CAPTURE AREA

FIELD

The present subject matter relates generally to gas turbine engines. More particularly, the subject matter relates to core inlets of gas turbine engines.

BACKGROUND

Supersonic flight has typically been accomplished by aircraft using turbofan engines having fan sections that include multiple stages of axial flow fans supported by a forward frame. However, these types of gas turbine engines can generate considerable noise during operation, especially the fan section. To reduce the noise propagating from the engine, a high pressure single-stage fan may be employed. The single-stage fan architecture reduces the number of fans to one and may eliminate the need for the forward frame, reducing engine weight, noise propagation, and drag. Moreover, to further reduce noise and the weight of the engine, the compressor section of the engine may be booster-less (i.e., absent a low pressure compressor).

Despite the benefits of single-stage fan, booster-less engine architecture, the core turbomachinery may be susceptible to foreign object debris (FOD) and/or ice/hail ingestion, as only the single-stage fan is present to centrifuge the FOD and/or ice/hail away from the core inlet and into the fan bypass duct. FOD and ice/hail ingestion can damage the core turbomachinery and can lead to unsatisfactory engine performance and efficiency, loss of thrust, and/or flameout.

Therefore, a gas turbine engine that protects the core turbomachinery from FOD and/or ice/hail ingestion would be useful. More particularly, a protected core inlet of a gas turbine engine would be beneficial.

BRIEF DESCRIPTION

Aspects and advantages of the invention will be set forth in part in the following description, or may be obvious from the description, or may be learned through practice of the invention.

One exemplary aspect of the present disclosure is directed to a gas turbine engine. The turbine engine defines a radial direction and an axial centerline and includes a core turbine engine and a fan section. The core turbine engine includes a splitter and defines a core inlet at the splitter. The splitter defines a splitter radius along the radial direction relative to the axial centerline. The fan section is positioned forward of the core turbine engine and includes a fan and a spinner. At least one of the core turbine engine and the spinner define a tangency radius along the radial direction relative to the axial centerline. The gas turbine engine defines a capture ratio less than about thirty-five percent (35%), wherein the capture ratio is a ratio of an area between the splitter radius and the tangency radius to an area encompassed by the splitter radius.

Another exemplary aspect of the present disclosure is directed to a gas turbine engine. The gas turbine engine defines a radial direction and an axial centerline. The gas turbine engine includes a core turbine engine and a fan section. The core turbine engine includes a splitter and defines a core inlet at the splitter. The splitter defines a splitter radius along the radial direction relative to the axial centerline. The fan section is positioned forward of the core turbine engine and includes a fan and a spinner. At least one of the core turbine engine and the spinner define a tangency radius along the radial direction relative to the axial centerline. The fan defines an airflow speed at the tangency radius greater than or equal to about eight hundred fifty (850) feet per second during operation of the gas turbine engine. Moreover, the gas turbine engine defines a capture ratio less than about fifty percent (50%), wherein the capture ratio is a ratio of an area between the splitter radius and the tangency radius to an area encompassed by the splitter radius.

Variations and modifications can be made to these exemplary aspects of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 is a close-up view of still another exemplary core inlet according to exemplary embodiments of the present subject matter.

DETAILED DESCRIPTION

Figure 1:
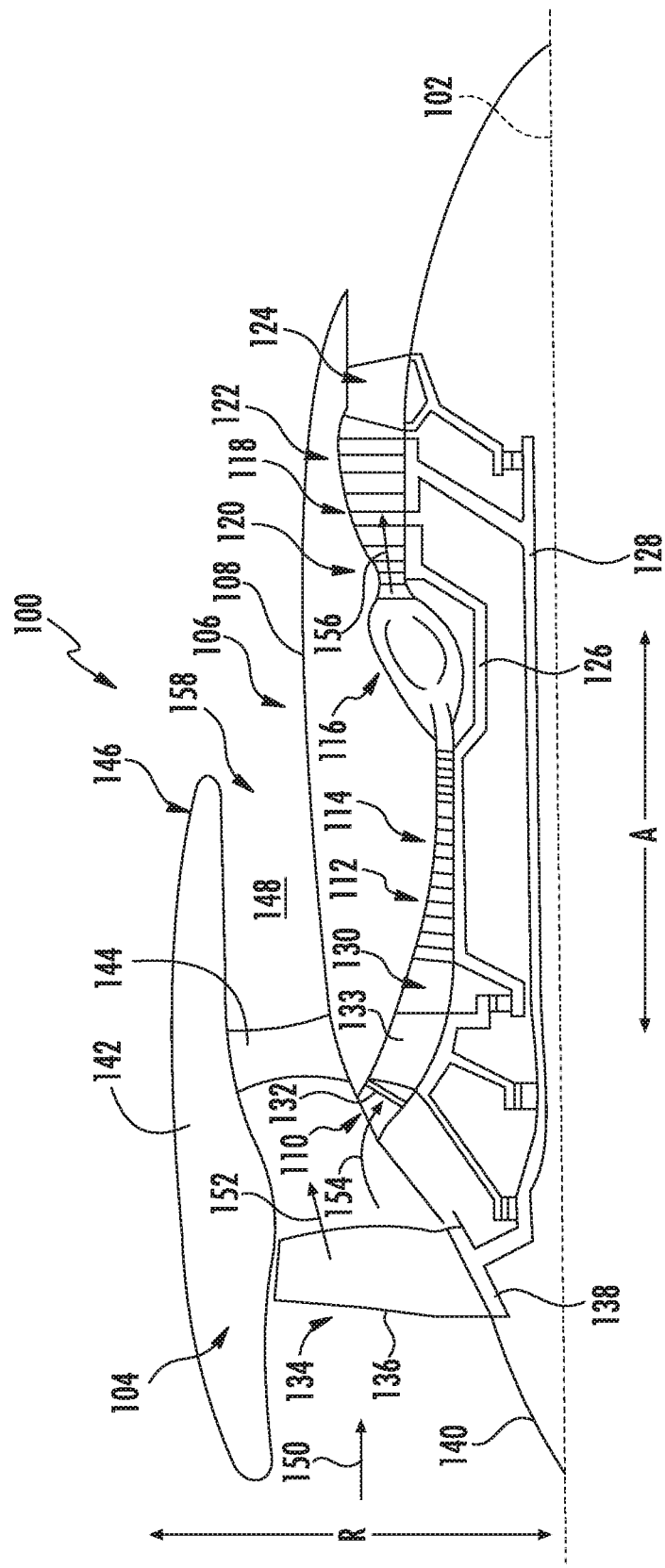
FIG. 1 is a schematic cross-sectional view of a turbofan engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the disclosed exemplary embodiments. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. "HP" denotes high pressure and "LP" denotes low pressure. "About" means at or within a ten percent (10%) margin of the noted amount or within manufacturing tolerances, whichever margin is greater.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between an axial centerline of the engine and an outer engine circumference or outer annulus. Radially inward is toward the axial centerline and radially outward is away from the axial centerline.

Generally, exemplary aspects of the present disclosure are directed to gas turbine engines that better protect the core turbomachinery of the engine from foreign object debris (FOD), ice, hail, dirt, and other objects (collectively "FOD"). In one exemplary embodiment, a core turbine engine of a gas turbine engine defines a core inlet that better protects downstream core turbomachinery from FOD. Specifically, the core turbomachinery can be better protected by orienting the core inlet with respect to an axial centerline such that the area available to capture FOD is minimized. Moreover, the core turbomachinery can be better protected by positioning the core inlet further into the outer annulus of the gas turbine engine, as well as by increasing the corrected airflow speed at a splitter of the engine, among other possible ways described herein.

Through use of a protected core inlet, the turbomachinery of the core turbine engine is better protected, leading to a better useful life of the engine and better engine efficiency and performance. Moreover, the need for traditional methods of centrifuging FOD away from or out of the core may be reduced or removed, reducing noise, engine weight, and the number of parts of the engine. Further aspects and advantages of the present subject matter will be apparent to those of skill in the art.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, referred to herein as "turbofan engine 100." As shown in FIG. 1, the turbofan engine 100 defines an axial direction A (extending parallel to an axial centerline 102 provided for reference), a radial direction R, and a circumferential direction (i.e., a direction extending about the axial direction A; not depicted). In general, the turbofan engine 100 includes a fan section 104 and a core turbine engine 106 disposed downstream from the fan section 104.

The exemplary core turbine engine 106 depicted includes a substantially tubular outer casing 108 that defines a radially outward portion of an annular core inlet 110. The outer casing 108 encases, in serial flow relationship, a compressor section 112, including a single compressor, which may be referred to as an HP compressor 114; a combustion section 116; a turbine section 118 including a HP turbine 120 and a LP turbine 122; and a jet exhaust nozzle section 124. An HP shaft or spool 126 drivingly connects the HP turbine 120 to the HP compressor 114. A LP shaft or spool 128 drivingly connects the LP turbine 122 to the fan section 104.

The compressor section 112, combustion section 116, turbine section 118, and jet exhaust nozzle section 124 together define a core air flowpath 130 through the core turbine engine 106. Notably, for the embodiment depicted, the core turbine engine 106 further includes a stage of inlet guide vanes 132 at a forward end of the core air flowpath 130 and a plurality of struts 133 positioned downstream of the inlet guide vanes 132 and upstream of the HP compressor 114.

For the embodiment depicted, the fan section 104 includes a fixed-pitch fan 134 having a plurality of fan blades 136 coupled to a disk 138 in a circumferentially spaced apart manner. More specifically, for the embodiment depicted, the fan 134 is a single-stage fan, i.e., a fan having a single stage of fan blades 136. As depicted, the fan blades 136 extend outwardly from the disk 138 generally along the radial direction R. The fan blades 136 and disk 138 are together rotatable about the axial centerline 102 by LP shaft 128. For the embodiment depicted, the LP shaft 128 extends to, and couples to, the fan 134. It will be appreciated, however, that the present disclosure is not limited to gas turbine engines having single-stage fan architecture.

Referring still to the exemplary embodiment of FIG. 1, the disk 138 is covered by rotatable spinner 140 aerodynamically contoured to promote an airflow through the plurality of fan blades 136. The spinner 140 is rotatable with the fan blades 136 and the disk 138 about the axial centerline 102. Additionally, the exemplary fan section 104 includes an annular fan casing or outer nacelle 142 that circumferentially surrounds the fan 134 and/or at least a portion of the core turbine engine 106. Alternatively, the core turbine engine 106 may be embedded within an aircraft (not shown) with extended fan ducts. The exemplary nacelle 142 depicted is supported relative to the core turbine engine 106 by a plurality of circumferentially spaced fan outlet guide vanes 144. Moreover, a downstream section 146 of the nacelle 142 extends over an outer portion of the core turbine engine 106 so as to define a bypass airflow passage 148 therebetween.

During operation of the turbofan engine 100, a volume of air 150 enters the turbofan engine 100 through the fan section 104. After the volume of air 150 passes across the fan blades 136, a first portion of air 152 is directed or routed into the bypass airflow passage 148 and a second portion of air 154 is directed or routed into the core air flowpath 130, and more specifically, through the core inlet 110 defined by the core turbine engine 106 to the core air flowpath 130. The ratio between the first portion of air 152 and the second portion of air 154 is commonly known as a bypass ratio. In this exemplary embodiment, the turbofan engine 100 has a bypass ratio of at least about 2:1. In other exemplary embodiments, turbofan engine 100 has a bypass ratio between about one (1) and about 4.5 (i.e., a bypass ratio between about 1:1 and about 4.5:1).

The second portion of air 154 flows through the core inlet 110 and is routed through the HP compressor 114 where the second portion of air 154 is pressurized. The pressurized second portion of air 154 then enters the combustion section 116, where it is mixed with fuel and burned to provide combustion gases 156.

The combustion gases 156 are routed through the HP turbine 120 where a portion of thermal and/or kinetic energy from the combustion gases 156 is extracted via sequential stages of HP turbine stator vanes (not labeled) that are coupled to the outer casing 108 and HP turbine rotor blades (not labeled) that are coupled to the HP shaft or spool 126, thus causing the HP shaft or spool 126 to rotate, thereby supporting operation of the HP compressor 114. The combustion gases 156 are then routed through the LP turbine 122 where a second portion of thermal and kinetic energy is extracted from the combustion gases 156 via sequential stages of LP turbine stator vanes (not labeled) that are coupled to the outer casing 108 and LP turbine rotor blades (not labeled) that are coupled to the LP shaft or spool 128, thus causing the LP shaft or spool 128 to rotate, thereby supporting operation of the fan 134.

The combustion gases 156 are subsequently routed through the jet exhaust nozzle section 124 of the core turbine engine 106 to provide propulsive thrust. Simultaneously, a pressure of the first portion of air 152 is substantially increased as the first portion of air 152 is routed through the bypass airflow passage 148 before it is exhausted from a fan nozzle exhaust section 158 of the turbofan 100, also providing propulsive thrust.

Further, for the embodiment depicted, the turbofan engine 100 is configured as a supersonic turbofan engine 100 configured to operate at flight speeds greater than Mach 1. Such may be accomplished due to the various design parameters of the turbofan engine 100, such as the single-stage fan 134 and booster-less compressor section (i.e., the compressor section including a single, HP compressor 114). Additionally, other design parameters, such as a fan pressure ratio, a bypass ratio, a fan diameter, an overall pressure ratio, etc., have been considered. For this embodiment, for instance, the single-stage fan 134 has a fan pressure ratio greater than 1.9. In other exemplary embodiments, the fan pressure ratio is greater than or equal to 2.0.

Figure 2:
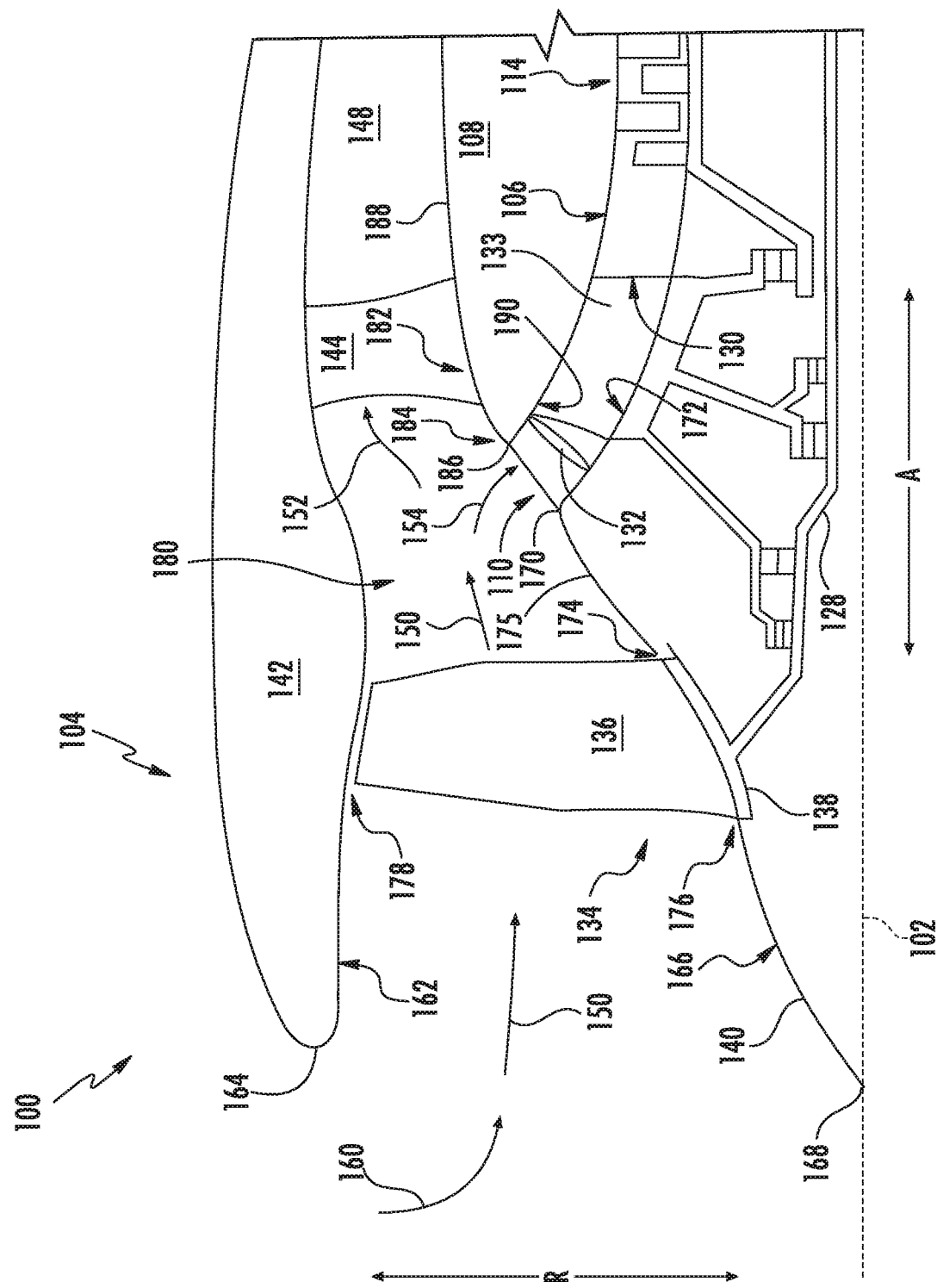
FIG. 2 is a cross-sectional view of a portion of a fan section and a forward end of a core turbine engine of the exemplary turbofan engine of FIG. 1 in accordance with an exemplary embodiment of the present disclosure.

FIG. 2 provides a cross-sectional view of a portion of the fan section 104 and forward end of the core turbine engine 106 of the exemplary turbofan engine 100 of FIG. 1. The volume of air 150 initially enters the turbofan engine 100 through an inlet 160 defined, for the embodiment depicted, between the spinner 140 and the nacelle 142. In particular, the nacelle 142 or outer fan casing has an inner wall 162 that is aerodynamically contoured to facilitate the flow of the volume of air 150 through or across the plurality of fan blades 136. The nacelle 142 has a forward end 164 that splits or divides a portion of incoming air generally radially outward into the ambient environment and also splits a portion of air generally radially inward into the inlet 160 of turbofan engine 100, which becomes part of the volume of air 150.

Likewise, the spinner 140 is aerodynamically contoured to facilitate efficient airflow of the volume of air 150 through or across the plurality of fan blades 136. More specifically, the spinner 140 is generally a dome-shaped structure defined by an outer shell 166. Spinner 140 could be any suitable shape, including a generally conical shape, a generally elliptical shape, or a combination of the two shapes (i.e., a coniptical shape), for example. In the illustrated embodiment of FIG. 2, spinner 140 is a generally coniptical shape. Spinner 140 extends in the axial direction from a spinner nose 168 at the forward end of the turbofan engine 100 to a juncture 174 of a liner 175 of the core turbine engine 106. The juncture 174 is defined aft of the fan blades 136 between the rotatable spinner 140 and the stationary liner 175. The liner 175, in turn, extends axially from the juncture 174 and into the core air flowpath 130 of the core turbine engine 106. Where the liner 175 forms a duct of the core air flowpath 130, the liner 175 may be referred to as an inner duct wall 172. The liner 175 defines an inner lip 170 to the core inlet 110, which is the most radially outward point of the liner 175.

As also depicted, each fan blade 136 extends radially outward from a blade root 176 to a blade tip 178. Each blade root 176 is coupled with disc 138 or a hub of disk, e.g., via a slotted-dovetail configuration, and each blade tip 178 is positioned in the outer annulus 180 of the turbofan engine 100 and radially spaced from the inner wall 162 of nacelle 142.

Referring still to FIG. 2, as the volume of air 150 passes through or across the fan blades 136, the volume of air 150 is centrifuged generally radially outward from the axial centerline 102. Moreover, ice, hail, and/or FOD that may have entered the inlet 160 of the turbofan engine 100 are also centrifuged generally radially outward by the fan blades 136 of fan 134.

After the volume of air 150 passes through or across the fan blades 136, the air is split or divided into the first portion of air 152 directed or routed into the bypass airflow passage 148 and the second portion of air 154 directed or routed into the core inlet 110 of the core turbine engine 106. In particular, a splitter 182 positioned at the forward end of the outer casing 108 splits the volume of air 150 into the first and second portions of air 152, 154. Splitter 182 has a splitter nose 184 that includes an outer lip 186. The outer lip 186 forms the forward most portion of the splitter nose 184 and connects an outer wall 188 of the outer casing 108 with an outer duct wall 190 that partially defines the core air flowpath 130 of the core turbine engine 106. For this embodiment, the inner lip 170 is positioned forward of the outer lip 186. The rear or aft end of the splitter 182 couples the outlet guide vanes 144 with the outer casing 108 as shown.

It should be appreciated, however, that the exemplary turbofan engine 100 depicted in FIGS. 1 and 2 is by way of example only, and that in other exemplary embodiments, the turbofan engine 100 may have any other suitable configuration. For example, in other embodiments, the fan 134 may include more than the single-stage of fan blades depicted, the fan 134 may be configured as a variable pitch fan, the turbofan engine 100 may include a reduction gearbox/power gearbox mechanically coupling the LP shaft 128 to the fan section 104, and the core turbine engine 106 may include any suitable number of compressors and/or turbines. Additionally, in other exemplary embodiments, each blade root 176 of the blades 136 could be coupled with a hub of disc 138. Moreover, fan 134 could have fan blades 136 integrally formed with a hub or disk portion so as to form a blisk. Moreover, in still other exemplary embodiments, aspects of the present disclosure may further be utilized with any other suitable gas turbine engine, such as a turboprop engine, turbojet engine, turboshaft engine, an engine configured for subsonic flight, etc.

Figure 3:
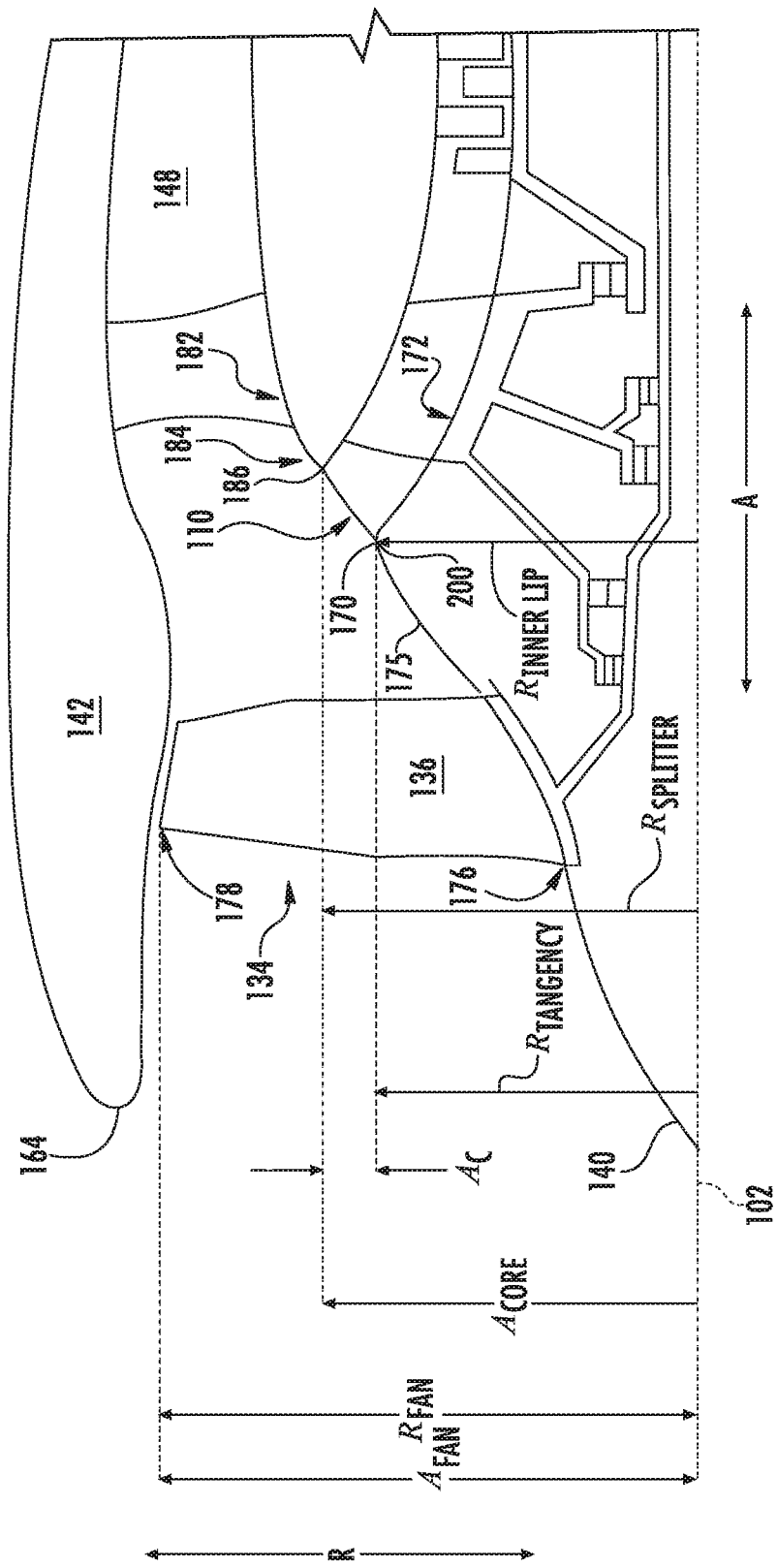
FIG. 3 is a cross-sectional view of the fan section of FIG. 1 detailing various ratios of an exemplary core inlet according to exemplary embodiments of the present subject matter.
Figure 4:
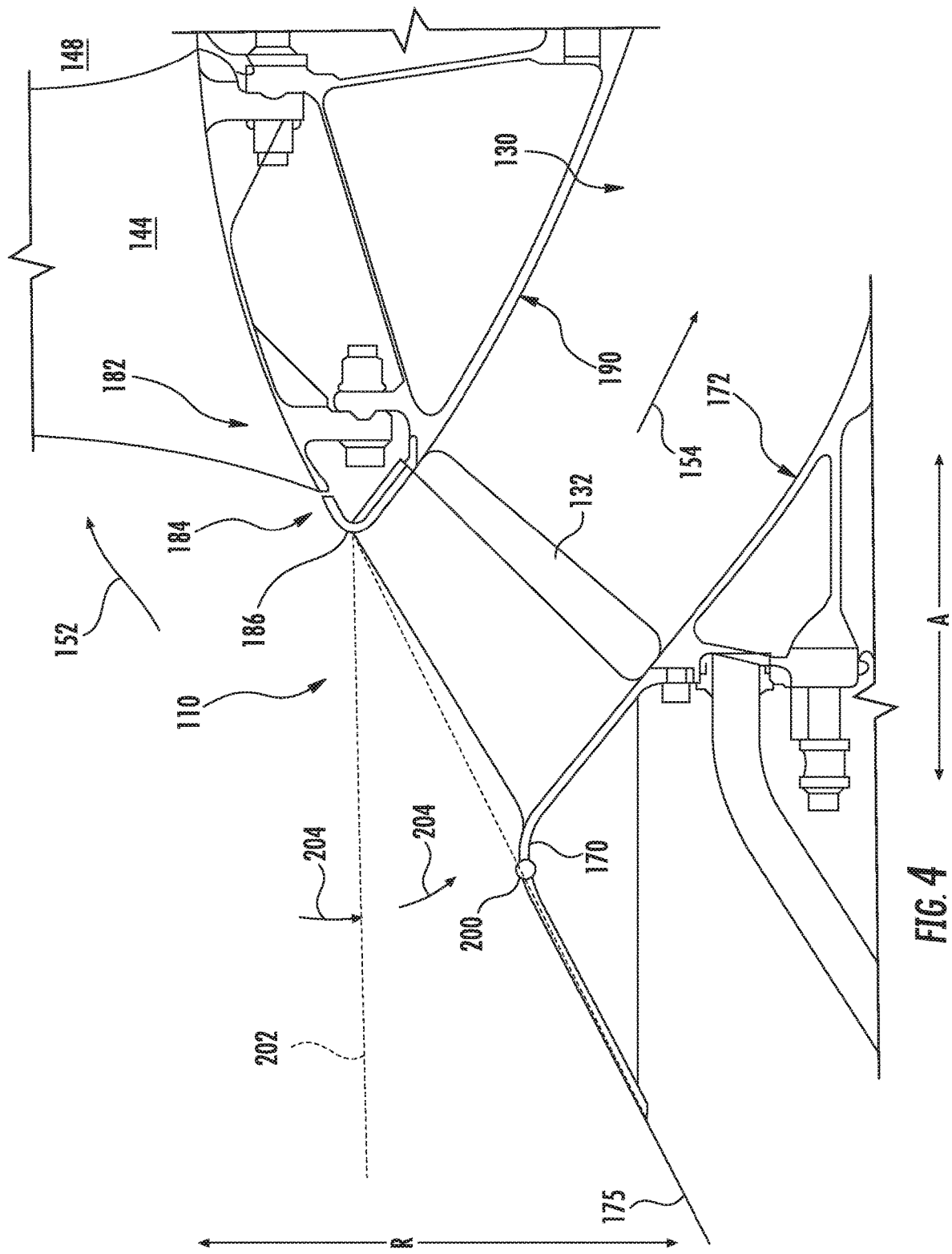
FIG. 4 is a close-up view of the exemplary core inlet of FIG. 3 according to exemplary embodiments of the present subject matter.

Referring now to FIGS. 3 and 4, FIG. 3 provides a cross-sectional view of the exemplary fan section 104 of FIGS. 1 and 2 accordingly to exemplary embodiments of the present subject matter. FIG. 4 provides a close-up view of the core inlet 110 of FIG. 3 to detail how a tangency point 200 is determined accordingly to exemplary embodiments of the present subject matter. A number of definitions and ratios will be discussed in turn.

As shown, the splitter 182 defines a splitter radius $R_{SPLITTER}$ along the radial direction R relative to the axial centerline 102. Specifically, the splitter radius $R_{SPLITTER}$ extends in the radial direction R from the axial centerline 102 to the outer lip 186 of the splitter nose 184.

With specific reference to FIG. 4, a tangency point 200 is shown more clearly. The tangency point 200 is a location where a reference line 202, a line originating at the splitter 182 and extending axially from a pivot point being located at the outer lip 186 of the splitter nose 184, first intersects at least one of the spinner 140 and the core turbine engine 106 (which includes the liner 175, which in turn includes the inner lip 170, the inner duct wall 172, the juncture 174 (FIG. 2), and the gap between the juncture 174 of the liner 175 and the spinner 140) as the reference line 202 is swung in a radially inward direction toward the axial centerline 102.

Stated differently, using the outer lip 186 as a pivot point, the location in which the reference line 202 first intersects a structure other than the fan blades 136 (i.e., at least one of the spinner 140 and the liner 175) as the reference line 202 is swung in a generally radially inward direction defines the tangency point 200. In this exemplary embodiment, the reference line 202 is swung radially inward as shown by arrows 204. The reference line 202 is swung until it first intersects a structure, which in this embodiment is at or proximate the inner lip 170. This location, where the reference line 202 first intersects a structure, is defined as the tangency point 200.

With specific reference now to FIG. 3, a tangency radius $R_{TANGENCY}$ is defined by at least one of the core turbine engine 106 (which includes the liner 175) and the spinner 140 along the radial direction R relative to the axial centerline 102. More specifically, the tangency radius $R_{TANGENCY}$ extends in the radial direction R from the axial centerline 102 to the tangency point 200.

The inner lip 170 defines an inner lip radius $R_{INNER\ LIP}$ along the radial direction R. More specifically, the inner lip radius $R_{INNER\ LIP}$ extends from the axial centerline 102 to the inner lip 170. In this embodiment, the tangency radius $R_{TANGENCY}$ is approximately equal to the inner lip radius $R_{INNER\ LIP}$, as the tangency point 200 is located at or proximate the inner lip 170.

A blade tip 178 of fan blade 136 defines a fan radius $R_{FAN}$. More specifically, the fan radius extends in the radial direction R from the axial centerline 102 to the blade tip 178 of fan blade 136.

Figure 5:
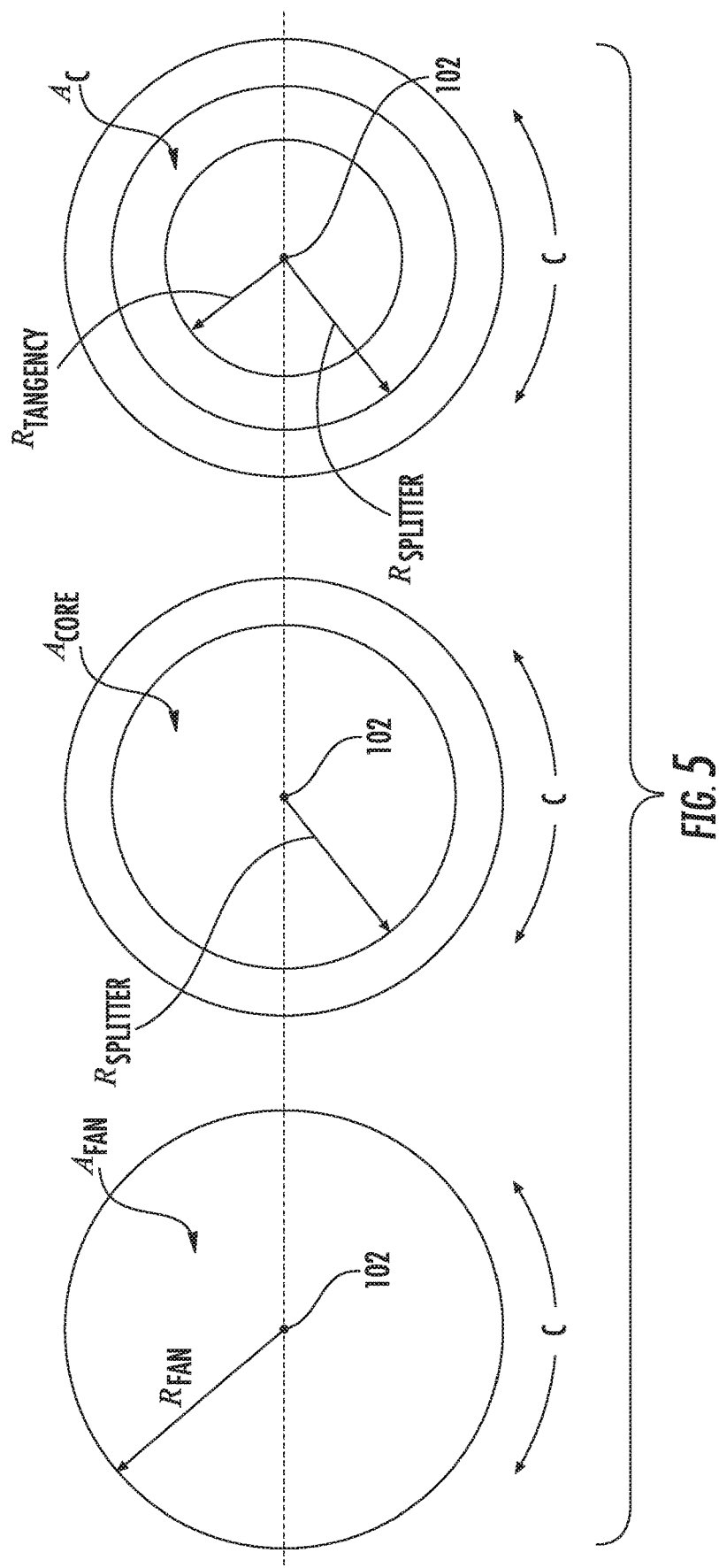
FIG. 5 is a schematic forward-looking rear view of various areas of the turbofan engine 100 of FIG. 3 according to exemplary embodiments of the present subject matter.

Referring now to FIGS. 3 and 5, FIG. 5 provides a schematic forward-looking rear view of various areas of the turbofan engine 100 of FIG. 3 to be presently defined according to exemplary embodiments of the present subject matter. The Total Fan Area, $A_{FAN}$, is an area extending in the radial direction R between the axial centerline 102 and the fan radius $R_{FAN}$ and extends in the circumferential direction C about the axial centerline 102. The Total Fan Area $A_{FAN}$ essentially represents the total area available to capture air, FOD, ice and/or hail into the turbofan engine 100. The Total Fan Area, $A_{FAN}$, is determined using the following equation:

$$A_{FAN} = \pi * R_{FAN}^2 \quad \text{(Equation 1)}$$

The Total Core Capture Area, $A_{CORE}$, is an area extending in the radial direction R between the splitter radius $R_{SPLITTER}$ and the axial centerline 102. The Total Core Capture Area, $A_{CORE}$, extends in the circumferential direction C about the axial centerline 102. The Total Core Capture Area, $A_{CORE}$, represents the total possible area available to capture FOD, ice, and hail into the core inlet 110. The Total Core Capture Area, $A_{CORE}$, is determined using the following equation:

$$A_{CORE} = \pi * R_{SPLITTER}^2 \quad \text{(Equation 2)}$$

The Capture Area, $A_C$, is an area extending in the radial direction R between the tangency radius $R_{TANGENCY}$ and the splitter radius $R_{SPLITTER}$ and extends in the circumferential direction C about the axial centerline 102. The Capture Area, $A_C$, is determined using the following equation:

$$A_C = \pi * (R_{SPLITTER}^2 - R_{TANGENCY}^2) \quad \text{(Equation 3)}$$

The Capture Area, $A_C$, represents the actual area available to capture FOD, ice, and hail into the core inlet 110. Stated differently, if FOD enters the turbofan engine 100 and is radially inward of the tangency radius $R_{TANGENCY}$ when the FOD contacts the spinner 140 or liner 175 or if the FOD is flowing radially outward of the splitter radius $R_{SPLITTER}$, the FOD will be routinely routed into the bypass airflow passage 148 and away from the core inlet 110.

Utilizing the definitions set forth above, a Total Capture Ratio is defined as follows:

$$\text{Total Capture Ratio} = \frac{A_C}{A_{FAN}} \quad \text{(Ratio 1)}$$

The Total Capture Ratio, or the ratio of the Capture Area $A_C$ to the Total Fan Area $A_{FAN}$, defines the fraction or percentage of the Total Fan Area that is available to capture FOD into the core inlet 110 of the core turbine engine 106. The greater the fraction or percentage, the greater the available area that may possibly capture FOD. Conversely, the smaller the fraction or percentage, the less the available area that may possibly capture FOD.

Once again, utilizing the definitions set forth above, a Capture Ratio is defined as follows:

$$\text{Capture Ratio} = \frac{A_C}{A_{CORE}} \quad \text{(Ratio 2)}$$

The Capture Ratio, or the ratio of the Capture Area $A_C$ to the Total Core Capture Area $A_{CORE}$, defines the fraction or percentage of the Total Core Capture Area that is available to capture FOD into the core inlet 110 of the core turbine engine 106. Similar to the Total Capture Ratio, the greater the fraction or percentage, the greater the area that may possibly capture FOD. Conversely, the smaller the fraction or percentage, the less the available area that may possibly capture FOD.

For the exemplary embodiment of FIG. 3, the Capture Ratio is about 0.30 and the Total Capture Ratio is about 0.15. Meaning, only about 30% of the Total Core Capture Area, $A_{CORE}$, is available to capture debris into the core inlet 110 of the core turbine engine 106. Further, only about 15% of the Total Fan Area, $A_{FAN}$, is available to capture debris into the core inlet 110 of the core turbine engine 106. Advantageously, the smaller the Capture Ratio, the less area that is available to "capture" FOD, ice, hail, etc. into the core inlet 110. Accordingly, the smaller the Capture Ratio, the better protected the turbomachinery of core turbine engine 106 is from FOD and other objects. In particular, where turbofan engine 100 is a boosterless, single-stage fan engine without traditional means to centrifuge FOD and ice/hail into the fan bypass duct (e.g., variable bleed valves/doors), the smaller Capture Ratio better protects the components of the core turbine engine 106.

In other exemplary embodiments, however, the above benefits may be achieved with other Capture Ratios and/or Total Capture Ratios. For example, in other exemplary embodiments, the Capture Ratio may be less than or equal to about fifty percent (50%) (1:2), less than or equal to about forty percent (40%) (2:5), less than or equal to about thirty-five percent (35%) (7:20), or less than or equal to about thirty percent (30%) (3:10), as noted above. In addition, in other exemplary embodiments, the Total Capture Ratio may be less than or equal to about thirty percent (30%) (3:10), less than or equal to about twenty percent (20%) (1:5), or less than or equal to about fifteen percent (15%) (3:20). All combinations of the Capture Ratios and the Total Capture Ratios noted above are contemplated.

Utilizing the definitions set forth above, a Tangency to Tip Ratio is defined as follows:

$$\text{Tangency to Tip Ratio} = \frac{R_{TANGENCY}}{R_{FAN}} \quad \text{(Ratio 3)}$$

The Tangency to Tip Ratio, or the ratio of the tangency radius $R_{TANGENCY}$ to the fan radius $R_{FAN}$ defines how far radially outward into the outer annulus 180 (FIG. 2) of the turbofan engine 100 the Capture Area $A_C$ is positioned. Where the Capture Area $A_C$ is positioned further radially outward into the outer annulus 180 of the turbofan engine 100, the turbomachinery of the core turbine engine 106 may be better protected. This is due in part because FOD, ice, and/or hail is more effectively centrifuged away from the core inlet 110 and into the bypass airflow passage 148 the further radially outward the Capture Area $A_C$ is positioned into the outer annulus 180, as the speed of the blade 136 increases in the radial outward direction from the blade root(s) 176 to the blade tips(s) 178 of the blade(s) 136.

For the exemplary embodiment of FIG. 3, the Tangency to Tip Ratio is about 0.50, or the tangency radius $R_{TANGENCY}$ extends about fifty percent (50%) the length of the fan radius $R_{FAN}$. Meaning, the tangency radius $R_{TANGENCY}$ extends radially about midway between the axial centerline 102 and the blade tip(s) 178 of the blade(s) 136. In this way, the Capture Area $A_C$, the area extending radially between the tangency radius $R_{TANGENCY}$ and the splitter radius $R_{SPLITTER}$ and extending circumferentially about the axial centerline 102, is positioned further into the outer annulus 180 where FOD may be more effectively centrifuged from the core inlet 110 of core turbine engine 106. In other exemplary embodiments, however, the above benefits may be achieved with other Tangency to Tip Ratios. For example, in other exemplary embodiments, the Tangency to Tip Ratio may be greater than or equal to about thirty-five percent (35%) (7:20), greater than or equal to about forty-five percent (45%) (9:20), greater than or equal to about fifty percent (50%) (1:2), greater than or equal to about fifty-five percent (55%) (11/20), greater than or equal to about sixty percent (60%) (3:5), greater than or equal to about sixty-five percent (65%) (13:20), greater than or equal to about seventy percent (70%) (7:10), or greater than or equal to about seventy-five percent (75%) (3:4).

Figure 6:
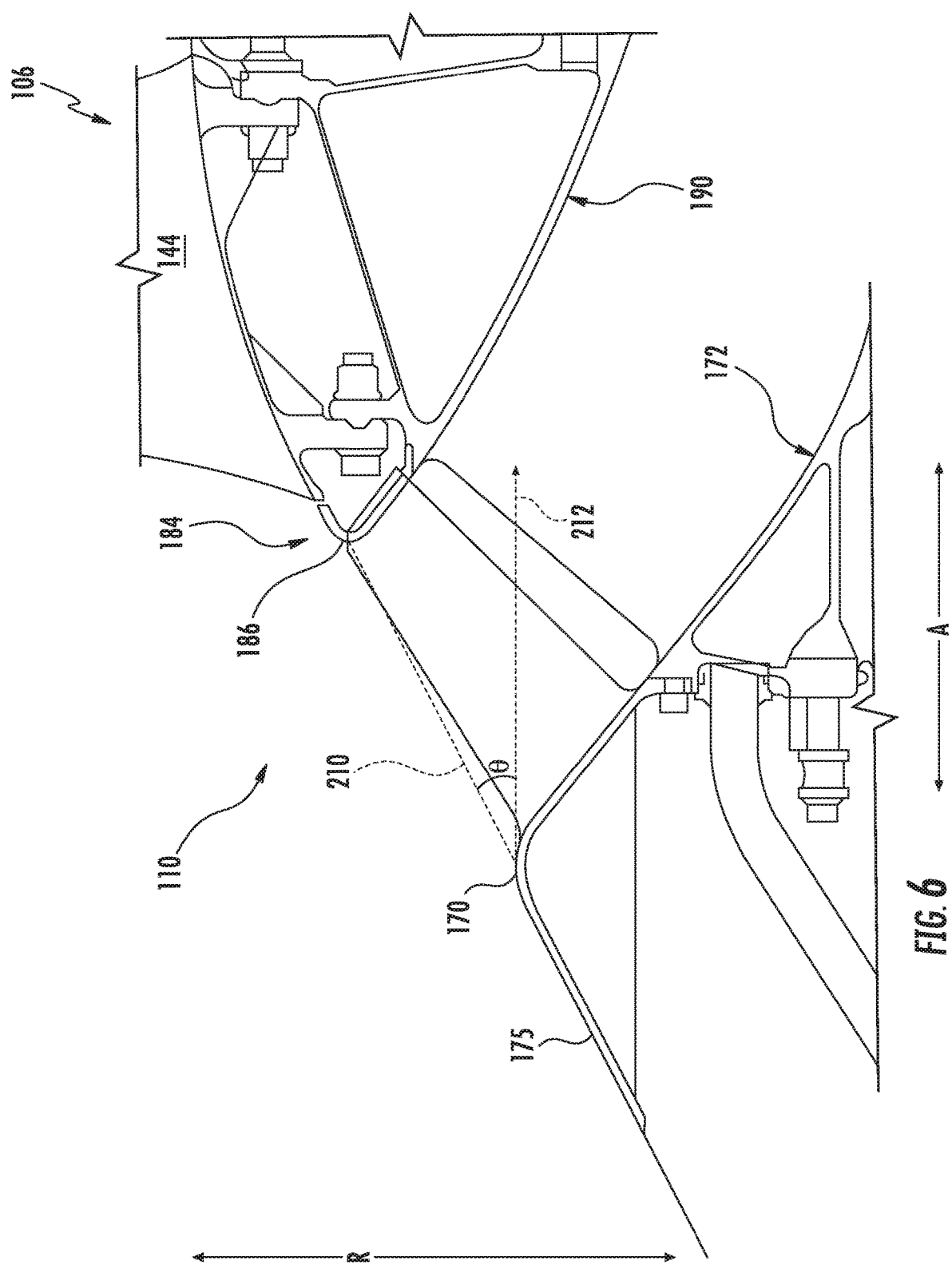
FIG. 6 is a close-up view of an exemplary core inlet according to exemplary embodiments of the present subject matter.

Referring now to FIG. 6, a close-up view of the exemplary core inlet 110 of the turbofan engine 100 of FIGS. 1 through 5 is provided. As is depicted, in this exemplary embodiment, the core turbine engine 106 defines the core inlet 110 between the inner lip 170 and the outer lip 186. The inner and outer lips 170, 186 define a core inlet reference line 210 extending therebetween. The core inlet reference line 210 defines an angle θ with respect to the axial centerline 102 (an axial reference line 212 is provided for reference). In this embodiment, angle θ is about thirty degrees (30°). The relatively small angle may result in a relatively small Capture Area $A_C$, which may lead to a relatively small Capture Ratio. In this manner, exemplary core inlet 110 having the core inlet reference line 210 at an angle θ of about thirty degrees (30°) may better protect the turbomachinery of the core turbine engine 106 from FOD, ice, and hail. It will be appreciated that in other exemplary embodiments that angle θ may be less than or equal to about thirty degrees (30°), which may further protect the turbomachinery of the core turbine engine 106. For example, in one exemplary embodiment, angle θ may be less than or equal to about twenty degrees (20°).

Figure 7:
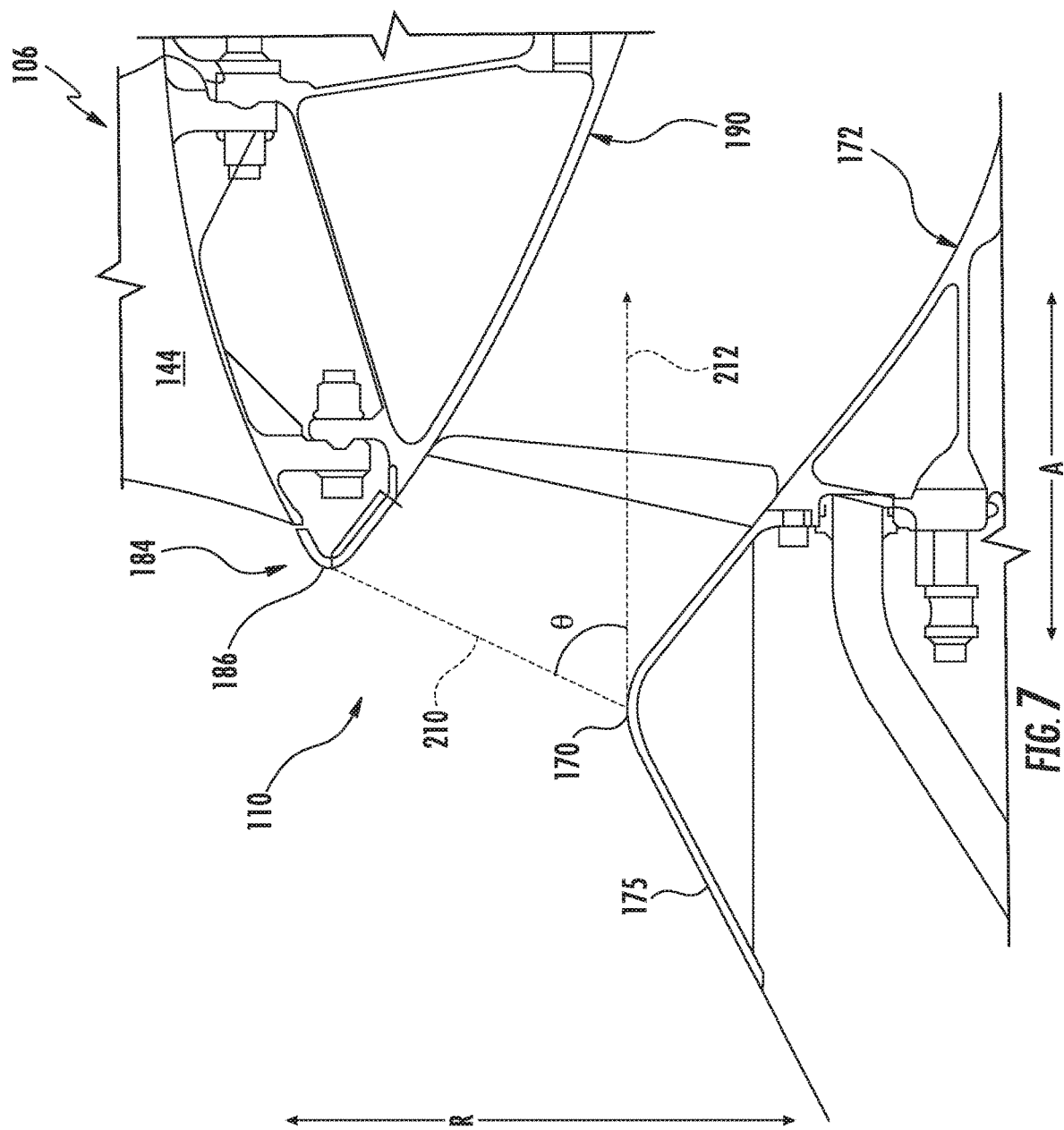
FIG. 7 is a close-up view of another exemplary core inlet according to exemplary embodiments of the present subject matter.

With reference now to FIG. 7, a close-up view of a core inlet 110 is provided in accordance with another exemplary embodiment of the present disclosure. The core inlet 110 of FIG. 7 may be configured in substantially the same manner as the exemplary core inlet 110 of FIG. 6. Accordingly, the same reference numerals may refer to the same parts. For example, the core turbine engine 106 has a core inlet 110 defined by an inner lip 170 and an outer lip 186 with a core inlet reference line 210 extending therebetween. However, for this exemplary embodiment, core inlet reference line 210 defines angle θ with respect to the axial centerline 102 (an axial reference line 212 is provided for reference) of about sixty degrees (60°). With an angle θ of about sixty degrees (60°), the turbomachinery of the core turbine engine 106 may still be protected from FOD, ice, and hail and may allow for more direct airflow into the core inlet 110 compared to the embodiment of FIG. 6. It will be appreciated that in other exemplary embodiments that angle θ may be less than or equal to about sixty degrees (60°) with respect to the axial centerline 102. For example, in one exemplary embodiment, angle θ is less than or equal to about forty-five degrees (45°) with respect to the axial centerline 102.

Referring now to FIG. 8, a close-up view of an exemplary core inlet 110 is provided. It will be appreciated that the fan creates varying airflow speeds at various points along the fan section and forward end of the core turbine engine as the fan blades rotate about the axial direction during operation. In particular, the speed of the volume of air 150 at the tangency point 200 will have a certain tangency corrected speed, $S_{TANGENCY}$, shown by arrow 214, and the volume of air 150 at the splitter 182 will have a certain splitter corrected speed, $S_{SPLITTER}$, shown by arrow 216. The corrected speed of the volume of air 150 will generally be greater at the splitter 182, as the splitter 182 is positioned further radially outward than the tangency point 200.

The speed of the airflow at the tangency point 200 may be a corrected speed corrected to a standard day condition, such that the corrected airflow speed at the tangency point 200 may be equal to:

$$S_{TANGENCY} = S_{TAN,ACT} * \sqrt{T_{AMB} \div 518.67°Ra} \quad \text{(Equation 4)}$$

where $S_{TAN,ACT}$ is the actual airflow speed at the tangency point 200 and $T_{AMB}$ is an ambient temperature in Rankine. The speed of the airflow at the splitter 182 may be a corrected speed corrected to a standard day condition, such that the corrected airflow speed at the splitter 182 may be equal to:

$$S_{SPLITTER} = S_{SPLIT,ACT} * \sqrt{T_{AMB} \div 518.67°Ra} \quad \text{(Equation 5)}$$

where $S_{SPLIT,ACT}$ is the actual airflow speed at the splitter 182 and $T_{AMB}$ is an ambient temperature in Rankine, as noted above.

In the exemplary embodiment of FIG. 8, the corrected airflow speed at the tangency point 200, $S_{TANGENCY}$, is greater than or equal to about nine hundred (900) feet per second (fps) (274 m/s). In other exemplary embodiments, however, the corrected airflow speed at the tangency point 200 may be greater than or equal to about eight hundred (800) fps, greater than or equal to about eight hundred fifty (850) fps, and/or greater than or equal to about nine hundred fifty (950) fps. Additionally, in the exemplary embodiment of FIG. 8, the corrected airflow speed at the splitter 182, $S_{SPLITTER}$, is greater than or equal to about one thousand fifty (1,050) feet per second (fps) (335 m/s). In other exemplary embodiments, however, the corrected airflow speed at the splitter 182, $S_{SPLITTER}$, may be greater than or equal about nine hundred fifty (950) fps, greater than or equal to about one thousand (1,000) fps, greater than or equal to about one thousand one hundred (1,100) fps, and greater than or equal to about one thousand one hundred and fifty (1,150) fps. Generally, the higher the tangency airflow corrected speed, $S_{TANGENCY}$, of the volume of air 150 at the tangency point 200, and the higher the corrected airflow speed, $S_{SPLITTER}$, of the volume of air 150 at the splitter 182, the better protected the turbomachinery of the core turbine engine 106 may be, as the higher corrected airflow speed may more effectively centrifuges FOD, ice, and/or hail away from the core inlet 110 and into the bypass airflow passage 148.

Moreover, it will be appreciated that fan 134 (FIG. 1) has a certain fan speed, $N_1$, as the blades 136 of fan rotate about the axial centerline 102. The frequency of the rotation where $N_1$ is at 100% capacity, such as during a takeoff operating mode, may be denoted as the revolutions per minute (rpm) of the fan 134, or $Fan_{RPM}$. In certain exemplary embodiments, the fan 134 (FIG. 1) has a fan RPM, $Fan_{RPM}$, of at least about seven thousand (7,000), such at least about seven thousand two hundred and fifty (7,250) rpm. Accordingly, it will be appreciated, that in certain exemplary embodiments of the present disclosure, a ratio of the Tangency Speed to fan RPM ($S_{TANGENCY}$ (in fps) to $Fan_{RPM}$) may be at least about 0.06, such as at least about 0.08, such as at least about 0.10, such as at least about 0.12. Similarly, it should be appreciated, that in certain exemplary embodiments of the present disclosure, a ratio of the Splitter Speed to fan RPM ($S_{SPLITTER}$ (in fps) to $Fan_{RPM}$) may be at least 0.10, such as at least 0.13, such as at least about 0.15. It will be appreciated that the splitter speed can be in any suitable units for speed, such as meters per second (m/s) or miles per hour (mph), for example. However, when assessing the Splitter Speed to fan RPM ratio or the Tangency Speed to fan RPM ratio, the units must first be converted to fps.

As further shown in FIG. 8, the core inlet 110 is defined by the inner lip 170 of the liner 175 and the outer lip 186 of the splitter 182. The outer lip 186 is spaced outward of the inner lip 170 along the radial direction R. The inner duct wall 172 extends aft of the inner lip 170. As depicted, a radial distance D1 extends along the radial direction R from the outer lip 186 to the inner duct wall 172 of the liner 175. Further, a distance D2 extends between the outer lip 186 of the splitter 182 and the inner lip 170 of the liner 175. Notably, for this embodiment, the distance D1 is greater than the distance D2, or stated another way, D1 >D2.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A gas turbine engine defining a radial direction and an axial centerline, the gas turbine engine comprising:
    a core turbine engine, the core turbine engine comprising a splitter and a liner defining an inner lip, the core turbine engine defining a core inlet at the splitter and the inner lip, the splitter defining a splitter radius along the radial direction relative to the axial centerline, wherein the splitter has a splitter nose having an outer lip located at the forward most portion of the splitter nose, the splitter nose being positioned outward of the inner lip along the radial direction relative to the axial centerline; and
    a fan section positioned forward of the core turbine engine and comprising a fan and a spinner, wherein the gas turbine engine defines an axial direction, and wherein the spinner has an outer shell and a spinner nose at a forward most portion of the spinner, and wherein the spinner extends along the axial direction between the spinner nose and a juncture aft of the fan along the axial direction, and wherein a slope of a curve including the outer shell and a liner portion extending from the juncture aft of the fan to the inner lip varies, and a radial distance from the axial centerline to the curve at each axial position is increasing in the axial direction from the spinner nose to the inner lip;
    at least one of the core turbine engine and the spinner defining a tangency radius along the radial direction relative to the axial centerline, wherein the tangency radius extends along the radial direction between the axial centerline and a tangency point, the tangency point being located aft of the fan;
    wherein the tangency point is a location where a reference line, a line originating from the outer lip of the splitter nose and extending axially, first intersects at least one of the spinner and the core turbine engine as the reference line, with a pivot point being located at the outer lip of the splitter nose, is swung in a radially inward direction toward the axial centerline and wherein the tangency point is axially closer to the inner lip than to the juncture aft of the fan; and
    wherein the gas turbine engine defines a capture ratio less than about thirty-five percent (35%), and wherein the capture ratio is a ratio of an area between the splitter radius and the tangency radius to an area encompassed by the splitter radius.

2. The gas turbine engine of claim 1, wherein the capture ratio is less than about thirty percent (30%).

3. The gas turbine engine of claim 1, wherein the fan defines a tangency airflow speed at the tangency radius and wherein the tangency airflow speed is between about eight hundred fifty (850) feet per second and about nine hundred fifty (950) feet per second during operation of the gas turbine engine.

4. The gas turbine engine of claim 1, wherein the fan is a single-stage fan, and wherein the single-stage fan defines a fan pressure ratio of about 2.0.

5. The gas turbine engine of claim 1, wherein the gas turbine engine is a supersonic gas turbine engine.

6. The gas turbine engine of claim 1, wherein the inner lip is positioned forward of the outer lip.

7. The gas turbine engine of claim 6, wherein the inner and outer lips define a core inlet reference line extending therebetween, wherein the core inlet reference line defines an angle with the axial centerline less than about thirty degrees (30°).

8. The gas turbine engine of claim 6, wherein the inner lip defines an inner lip radius along the radial direction, and wherein the tangency radius is approximately equal to the inner lip radius.

9. The gas turbine engine of claim 1, wherein the fan defines a splitter airflow speed in feet per second at the splitter radius and the fan defines a fan revolutions per minute during operation of the gas turbine engine, and wherein the gas turbine engine defines a splitter airflow speed to fan rpm ratio between about 0.10 and about 0.15.

10. The gas turbine engine of claim 1, wherein the fan defines a tangency airflow speed in feet per second at the tangency radius and the fan defines a fan revolutions per minute (rpm) during operation of the gas turbine engine, and wherein the gas turbine engine defines a tangency airflow speed to fan rpm ratio between about 0.06 and about 0.12.

11. The gas turbine engine of claim 1, wherein the fan comprises a fan blade having a blade tip, the fan defining a fan radius extending in the radial direction between the axial centerline and the blade tip, wherein the gas turbine engine defines a tangency to tip ratio between about 0.50 and 0.75, wherein the tangency to tip ratio is a ratio of the tangency radius to the fan radius.

12. A gas turbine engine defining a radial direction and an axial centerline, the gas turbine engine comprising:
a core turbine engine, the core turbine engine comprising a splitter defining an outer lip of a core inlet of the core turbine engine, the splitter defining a splitter radius along the radial direction relative to the axial centerline, wherein the splitter has a splitter nose having an outer lip located at the forward most portion of the splitter nose, the splitter nose being positioned outward of the inner lip along the radial direction relative to the axial centerline, and wherein the core turbine has a liner defining an inner lip of the core inlet and an inner duct wall extending aft of the inner lip, the inner lip positioned inward of the outer lip along the radial direction; and
a fan section positioned forward of the core turbine engine and comprising a fan and a spinner, wherein the gas turbine engine defines an axial direction, and wherein the spinner has an outer shell and a spinner nose at a forward most portion of the spinner, and wherein the spinner extends along the axial direction between the spinner nose and a juncture aft of the fan along the axial direction, and wherein a slope of a curve including the outer shell and a liner portion extending from the juncture aft of the fan to the inner lip varies, and a radial distance from the axial centerline to the curve at each axial position is increasing in the axial direction from the spinner nose to the inner lip;
at least one of the core turbine engine and the spinner defining a tangency radius along the radial direction relative to the axial centerline, wherein the tangency radius extends along the radial direction between the axial centerline and a tangency point, the tangency point being located aft of the fan,
wherein the tangency point is a location where a reference line, a line originating from the outer lip of the splitter nose and extending axially, first intersects at least one of the spinner and the core turbine engine as the reference line, with a pivot point being located at the outer lip of the splitter nose, is swung in a radially inward direction toward the axial centerline and wherein the tangency point is axially closer to the inner lip than to the juncture aft of the fan; and
the fan defining an airflow speed at the tangency radius between about eight hundred fifty (850) feet per second and about nine hundred fifty (950) feet per second during operation of the gas turbine engine;
wherein the gas turbine engine defines a capture ratio less than about fifty percent (50%), wherein the capture ratio is a ratio of an area between the splitter radius and the tangency radius to an area encompassed by the splitter radius.

13. The gas turbine engine of claim 12, wherein the gas turbine engine defines the capture ratio is less than about thirty-five percent (35%).

14. The gas turbine engine of claim 12, wherein the fan comprises a fan blade having a blade tip, the fan defining a fan radius extending in the radial direction between the axial centerline and the blade tip, wherein the gas turbine engine defines a tangency to tip ratio between about 0.45 and about 0.75, wherein the tangency to tip ratio is a ratio of the tangency radius to the fan radius.

15. The gas turbine engine of claim 12, wherein the fan is a single stage fan and the core turbine engine is booster-less.

16. A gas turbine engine defining a radial direction and an axial centerline, the gas turbine engine comprising:
a core turbine engine, the core turbine engine comprising a splitter defining a core inlet at the splitter, the splitter defining a splitter radius along the radial direction relative to the axial centerline, wherein the splitter has a splitter nose having an outer lip located at the forward most portion of the splitter nose, the splitter nose being positioned outward of the inner lip along the radial direction relative to the axial centerline; and
a fan section positioned forward of the core turbine engine and comprising a fan and a spinner, the fan having a fan blade that has a blade tip, the fan defining a fan radius extending in the radial direction between the axial centerline and the blade tip,
wherein the gas turbine engine defines an axial direction, and wherein the spinner has an outer shell and a spinner nose at a forward most portion of the spinner, and wherein the spinner extends along the axial direction between the spinner nose and a juncture aft of the fan along the axial direction, and wherein a slope of a curve including the outer shell and a liner portion extending from the juncture aft of the fan to the inner lip varies, and a radial distance from the axial centerline to the curve at each axial position is increasing in the axial direction from the spinner nose to the inner lip,
at least one of the core turbine engine and the spinner defining a tangency radius along the radial direction relative to the axial centerline, wherein the tangency radius extends along the radial direction between the axial centerline and a tangency point, the tangency point being located aft of the fan,
wherein the tangency point is a location where a reference line, a line originating from the outer lip of the splitter nose and extending axially, first intersects at least one of the spinner and the core turbine engine as the reference line, with a pivot point being located at the outer lip of the splitter nose, is swung in a radially inward direction toward the axial centerline and wherein the tangency point is axially closer to the inner lip than to the juncture aft of the fan; and
wherein the gas turbine engine defines a capture ratio less than about thirty-five percent (35%), and wherein the capture ratio is a ratio of an area between the splitter radius and the tangency radius to an area encompassed by the splitter radius, and wherein the gas turbine engine defines a tangency to tip ratio between about 0.45 and 0.75, wherein the tangency to tip ratio is a ratio of the tangency radius to the fan radius.

* * * * *